(12) United States Patent
Horn et al.

(10) Patent No.: US 9,507,686 B2
(45) Date of Patent: Nov. 29, 2016

(54) SYSTEM, METHOD, AND COMPUTER PROGRAM PRODUCT FOR MONITORING HEALTH OF COMPUTER SYSTEM ASSETS

(71) Applicant: NetApp, Inc., Sunnyvale, CA (US)

(72) Inventors: Ophir Horn, Waltham, MA (US); Srivardhan Sunkesula, Waltham, MA (US); Ran Gilboa, Waltham, MA (US)

(73) Assignee: NETAPP, INC., Sunnyvale, CA (US)

( * ) Notice: Subject to any disclaimer, the term of this patent is extended or adjusted under 35 U.S.C. 154(b) by 92 days.

(21) Appl. No.: 14/198,302

(22) Filed: Mar. 5, 2014

(65) Prior Publication Data

US 2015/0180739 A1 Jun. 25, 2015

Related U.S. Application Data

(60) Provisional application No. 61/919,487, filed on Dec. 20, 2013.

(51) Int. Cl.
| | |
|---|---|
| G06F 15/173 | (2006.01) |
| G06F 11/32 | (2006.01) |
| G06F 9/445 | (2006.01) |
| H04L 12/26 | (2006.01) |
| G06F 11/07 | (2006.01) |

(Continued)

(52) U.S. Cl.
CPC ............ *G06F 11/328* (2013.01); *G06F 8/60* (2013.01); *G06F 8/65* (2013.01); *G06F 8/71* (2013.01); *G06F 11/0793* (2013.01); *G06F 11/2028* (2013.01); *G06F 11/3006* (2013.01); *G06F 11/3452* (2013.01); *G06Q 30/0631* (2013.01); *H04L 41/147* (2013.01); *H04L 41/22* (2013.01); *H04L 43/00* (2013.01); *H04L 43/04* (2013.01); *H04L 43/045* (2013.01); *H04L 43/065* (2013.01); *H04L 43/0894* (2013.01); *H04L 67/34* (2013.01); *H04L 67/36* (2013.01)

(58) Field of Classification Search
CPC ............................ H04L 12/26; H04L 12/24
USPC ........................................ 709/224, 225, 226
See application file for complete search history.

(56) References Cited

U.S. PATENT DOCUMENTS

| | | |
|---|---|---|
| 6,694,288 B2 | 2/2004 | Smocha et al. |
| 6,944,654 B1 | 9/2005 | Murphy et al. |

(Continued)

OTHER PUBLICATIONS

Hoffman C., What is a Virtual Machine?, [Retrieved from the Internet] [Online] Jul. 18, 2012, 6 pages.

(Continued)

*Primary Examiner* — Vivek Srivastava
*Assistant Examiner* — Normin Abedin
(74) *Attorney, Agent, or Firm* — Klein, O'Neill & Singh, LLP

(57) ABSTRACT

A method of displaying health information of a system asset in a computer system, the method including: accessing a data log associated with the system asset, wherein the data log includes a store of the health information of the system asset, identifying a plurality of state entries in the store of the health information, each of the state entries including a timestamp and a state of the system asset at the respective time stamp, generating a timeline based on the state entries, the timeline having a plurality of chronological portions defined by the timestamps, wherein each portion of the timeline is assigned a visual cue based on a state associated with its respective state entries, and visually rendering the timeline upon a computer display.

23 Claims, 3 Drawing Sheets

(51) Int. Cl.

| | | |
|---|---|---|
| *G06F 9/44* | (2006.01) | |
| *G06F 11/20* | (2006.01) | |
| *G06F 11/30* | (2006.01) | |
| *G06F 11/34* | (2006.01) | |
| *H04L 12/24* | (2006.01) | |
| *H04L 29/08* | (2006.01) | |
| *G06Q 30/06* | (2012.01) | |

(56) References Cited

U.S. PATENT DOCUMENTS

| | | | |
|---|---|---|---|
| 7,509,229 | B1 | 3/2009 | Wen |
| 7,703,091 | B1 | 4/2010 | Martin et al. |
| 7,752,301 | B1 * | 7/2010 | Maiocco ............... G06F 15/173 709/224 |
| 7,827,154 | B1 | 11/2010 | Spertus et al. |
| 7,844,701 | B2 | 11/2010 | Ramany et al. |
| 8,176,483 | B2 | 5/2012 | Hoefler et al. |
| 8,381,208 | B2 | 2/2013 | Burke et al. |
| 8,813,063 | B2 | 8/2014 | Uthe |
| 9,239,715 | B1 | 1/2016 | Jaisinghani et al. |
| 9,348,573 | B2 | 5/2016 | Lightner et al. |
| 2002/0049687 | A1 * | 4/2002 | Helsper ............... G06F 11/3447 706/45 |
| 2003/0135382 | A1 | 7/2003 | Marejka et al. |
| 2004/0210653 | A1 | 10/2004 | Kanoor et al. |
| 2004/0243636 | A1 | 12/2004 | Hasiewicz et al. |
| 2004/0267718 | A1 | 12/2004 | Milligan et al. |
| 2006/0075276 | A1 | 4/2006 | Kataria et al. |
| 2007/0027985 | A1 | 2/2007 | Ramany et al. |
| 2007/0061308 | A1 | 3/2007 | Hartwell et al. |
| 2007/0124465 | A1 | 5/2007 | Malloy et al. |
| 2008/0141240 | A1 | 6/2008 | Uthe |
| 2008/0215601 | A1 | 9/2008 | Seki |
| 2008/0243862 | A1 | 10/2008 | Pathak et al. |
| 2009/0281923 | A1 | 11/2009 | Selinger et al. |
| 2010/0082847 | A1 | 4/2010 | Yasui |
| 2010/0198845 | A1 | 8/2010 | Kutsch et al. |
| 2010/0318986 | A1 | 12/2010 | Burke et al. |
| 2011/0208855 | A1 | 8/2011 | Robertson et al. |
| 2012/0129503 | A1 | 5/2012 | Lindeman et al. |
| 2013/0031414 | A1 | 1/2013 | Dhuse et al. |
| 2013/0091168 | A1 | 4/2013 | Bhave et al. |
| 2013/0152047 | A1 | 6/2013 | Moorthi et al. |
| 2013/0343213 | A1 | 12/2013 | Reynolds et al. |
| 2013/0346841 | A1 | 12/2013 | Ahmed et al. |
| 2014/0013265 | A1 | 1/2014 | Goranka |
| 2014/0143768 | A1 | 5/2014 | Kazalski et al. |
| 2014/0149974 | A1 | 5/2014 | Bank et al. |
| 2014/0280894 | A1 | 9/2014 | Reynolds et al. |
| 2015/0067143 | A1 | 3/2015 | Babakhan et al. |
| 2015/0312283 | A1 | 10/2015 | Edwards et al. |

OTHER PUBLICATIONS

Non-Final Office Action mailed Aug. 27, 2015 for U.S. Appl. No. 14/310,979, filed Jun. 20, 2014, 22 pages.
Non-Final Office Action mailed Feb. 26, 2016 for U.S. Appl. No. 14/311,011, filed Jun. 20, 2014, 25 pages.
Final Office Action mailed Mar. 15, 2016 for U.S. Appl. No. 14/310,979, filed Jun. 20, 2014, 31 pages.
Non-Final Office Action mailed Nov. 10, 2015 for U.S. Appl. No. 14/198,332, filed Mar. 5, 2014, 9 pages.
Notice of Allowance mailed Jan. 29, 2016 for U.S. Appl. No. 14/198,332, filed Mar. 5, 2014, 8 pages.
Non-Final Office Action mailed Feb. 2, 2016 for U.S. Appl. No. 14/310,994, filed Jun. 20, 2014, 16 pages.
Final Office Action mailed Aug. 11, 2016 for U.S. Appl. No. 14/310,994.
Final Office Action mailed Aug. 24, 2016 for U.S. Appl. No. 14/311,011.
Notice of Allowance mailed Aug. 26, 2016 for U.S. Appl. No. 14/310,979.
Massie et al.; "The ganglia distributed monitoring system: desing, implementation, and experience"; Parallel Computing vol. 30, Issue 7, Jun. 15, 2004; pp. 817-840.
Pruett et al.; "BladeCenter systems management software"; IBM Journal of Research and Development, vol. 49, No. 6, Nov. 2005; pp. 963-975.
Lindquist et al.; "IBM Service Management architecture"; IMB Systems Journal, vol. 46, No. 3, 2007; pp. 423-440.
Notice of Allowance mailed May 6, 2016, for U.S. Appl. No. 14/198,332, filed Mar. 5, 2015, 7 pages.

* cited by examiner

| Data sources | |
|---|---|
| B1 | 302 |

Summary

Acquisition Unit: 304 — Local

Type: 306 — Brocade SSH

Type of data collected: 308 — Configuration, Performance

Comments: 310 — ☑ Do not touch!
Joe is working on the switch and will get this fixed by 9.08.2014

Configuration recent status: 312 — Success

Performance recent status: 314 — Ok

Software package: 2.0.x — 315

[Edit] [Poll again] [Error report] [Install a patch] [Postpone] [Delete]

Event timeline (last 15 days)

Click a data source event in the timeline below to show its details 320  321  322  323 324  325  326  327
Configuration
Performance
330  331  332  333  334 335 336  337
3 WEEKS AGO | 2 WEEKS AGO | 1 WEEK AGO 350 — Performance 9/9/2013 17:02:01 - 9/10/2013 02:00:01

| Device | Description |
|---|---|
| Switch 102.11.45.33 | Success |
| Switch 102.11.45.34 | Failed to parse connectivity table |
| Switch 102.11.45.35 | Success |
| Switch 102.11.45.36 | Success |
| Switch 102.11.45.37 | Success |
| Zoning | Success |
| Switch 102.11.45.38 | Success |
| Switch 102.11.45.39 | Success |

340

SYSTEM, METHOD, AND COMPUTER PROGRAM PRODUCT FOR MONITORING HEALTH OF COMPUTER SYSTEM ASSETS

CROSS REFERENCE TO RELATED APPLICATIONS

The present application claims the benefit of U.S. Provisional Patent Application No. 61/919,487, filed Dec. 20, 2013, and entitled "System, method, and computer program product for monitoring infrastructure and assets," the disclosure of which is incorporated by reference herein in its entirety.

TECHNICAL FIELD

The present disclosure relates generally to computing system monitoring and, more particularly, to monitoring the health of computing system assets.

BACKGROUND

Information storage systems may include a variety of different hardware and software components. For instance, a storage system may include one or more storage controllers, where each of the storage controllers provides the low-level control for a plurality of physical storage drives. The storage system may also include network connections and other items that are ancillary to the storage functionality of the system. Storage systems continue to become more and more complex, with storage controllers hosting an increasing number of logical storage volumes and storage controllers being clustered rather than simply standing alone. There is currently a need for a management application that monitors assets of storage systems in an efficient and intuitive manner.

Some current storage monitoring systems gather operational data from multitudes of storage items in a given storage system. Examples of storage items includes virtual volumes, storage drive hardware, storage controllers, network interfaces, and the like. A storage monitoring system then logs the operational data for the storage system in a database. In case of a failure, an administrator of the storage system may access the log of operational data to determine when errors occurred, what the errors were, and which devices had no errors.

Viewing data logs of operational data has been somewhat effective in current systems to provide an administrator with actionable information. However, the data log as displayed is text-based with status and timestamps, and text-based data has the limitation of not being optimally intuitive nor quickly comprehensible. Accordingly, there is a need for a more intuitive storage monitoring system.

BRIEF DESCRIPTION OF THE DRAWINGS

FIG. 3 is an example display of system asset health information according to one embodiment.

DETAILED DESCRIPTION

Figure 1:
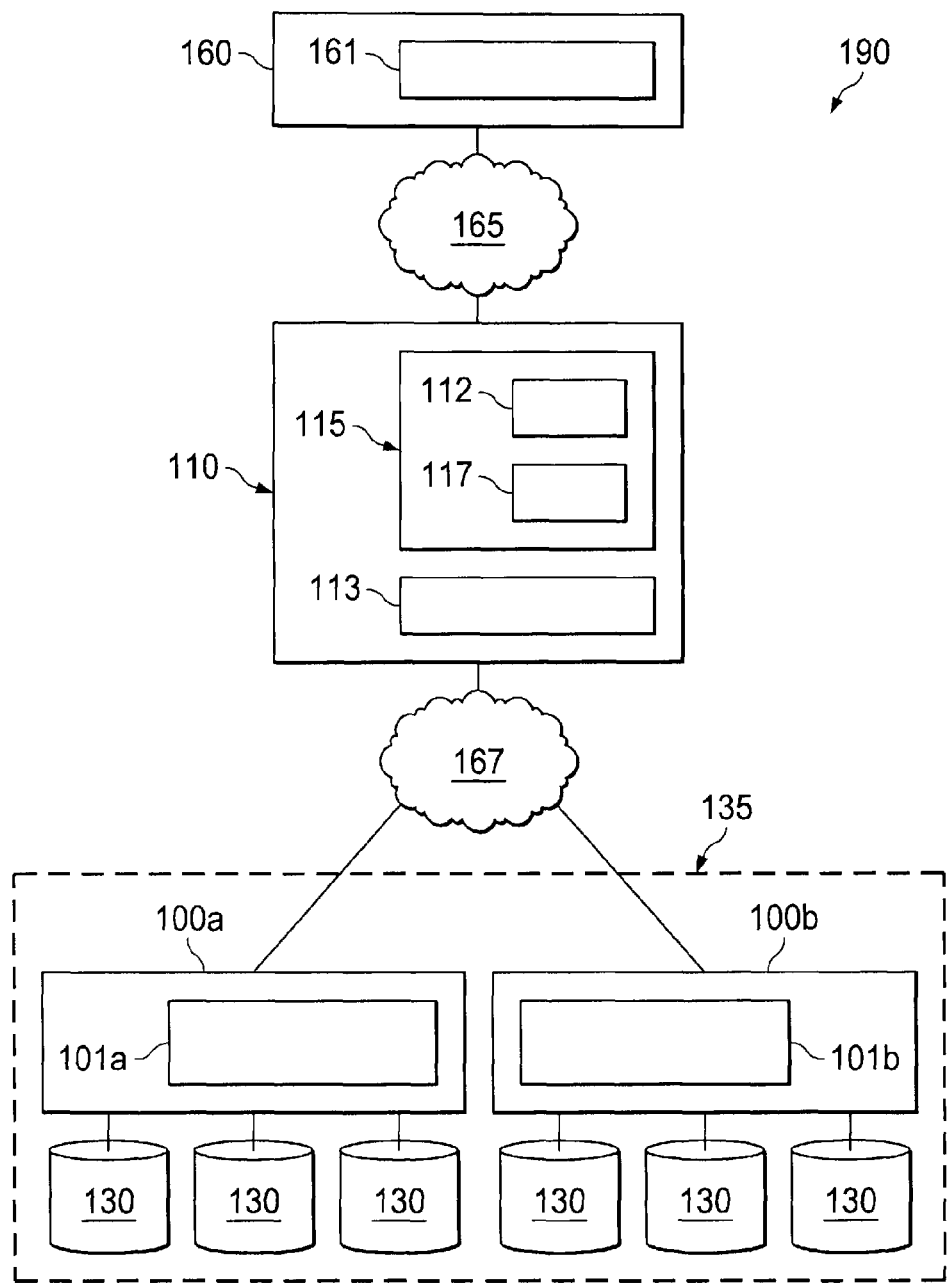
FIG. 1 is an illustration of a network storage system adapted according to one embodiment.

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Various embodiments of the present disclosure provide monitoring of a computer system that is both efficient and easy to understand for a human user. One embodiment includes a user interface that provides an intuitive display of system asset health information within a timeline graph. For instance, a user may select a system asset from a variety of system assets and be directed to a display of the selected asset's health information. The health information is rendered visually in a timeline graph that uses visual cues to differentiate health statuses of the system asset over time.

Continuing with the example, the timeline includes visual cues, such as different colors or fill patterns to represent the different statuses. For instance, a timeline color of red may indicate the presence of an error during a specific period of time, whereas a color of blue may indicate no errors present during another specific time. However, any appropriate visual cue may be used in other embodiments.

In another example, there are three statuses: no error, collection suspended, and error present. Also, each of the statuses are plotted on the timeline against specific time periods. Thus, over time and within a large, displayed time period, the visual cues representing the different statuses are readily apparent from a quick visual inspection of the interface. An administrator can view periods having error statuses and periods of normal operation within a single view plotted against the progress of time.

In some examples, the visual interface is interactive, allowing a user to select portions of the interface to receive more information. Each of the regions within the timeline graph can be screen control elements (e.g., buttons or links) that, when selected, display to the user hardware and software components within a system asset and applicable error states, if any, during the time period represented by the selected region. Furthermore, selection of a particular region of the timeline may cause the visual cue of the timeline to be changed itself (e.g., highlighted) to indicate that the region has been selected.

The scope of embodiments may include rendering the visual interface using any appropriate techniques. In one embodiment, logic within a management server loads data from the data log, parses the data, and generates an interactive interface based on the parsed data log. In one example an application parses the data log to create the timeline graph. For instance, for a given system asset, the application examines the data log for entries corresponding to the system asset. It then parses each entry for its timestamp and health information. Each timeline is created by mapping status to timestamps to create chronologically-ordered periods of time that represent the statuses. The display may be created in any appropriate manner, one example includes logic in the application to generate web-based graphics. For instance, the logic may generate HTML or other code configured to cause the timeline to be rendered when processed by a web browser.

Various embodiments may be more intuitive for a human user to understand than previous solutions employing data logs only. Specifically, it is generally expected that a human user would be able to comprehend more information more quickly from a visual timeline graph than from data logs in text form only. However, various embodiments may include the display of text-based log information to supplement timeline information. In other words, one advantageous use of some embodiments is to employ the timeline as a quick reference to identify time periods having errors. When those time periods are discovered, a human user may then request data log information to investigate specific errors associated with the time period.

The example of FIG. 1 below is directed to a network storage system, and the scope of embodiments is applicable to a wide variety of computer systems other than storage systems. Accordingly, the concepts described herein for monitoring and analyzing system data may be applied to computing systems generally.

FIG. 1 is an illustration of a network storage system 190 adapted according to one embodiment. Various embodiments of the present disclosure may be implemented by the network storage system 190, as described in more detail below.

The system 190 includes server system 110 connected to client system 160 via a network 165. The server system 110 accesses storage subsystems 100 that are connected to the server system 110 via a network 167. The storage subsystems 100 are included in a cluster 135. Each storage system 100 in the cluster 135 includes a set of storage devices 130 for storing client data, the storage devices 130 of the cluster 135 providing the shared storage of the storage system 100. Each storage subsystem 100 also includes a storage controller 101. Each storage controller 101 exercises low-level control over physical storage devices 130 to provide virtualized storage to server system 110 and client 160. Examples of storage hardware that can be used as physical storage devices 130 includes, e.g., hard disk drives and solid state drives, though the scope of embodiments is not limited to any particular storage hardware.

Each storage device 130 may store data to logical storage entities such as one or more storage volumes, where each volume has a file system implemented on the volume. A file system implemented on the logical storage entity may provide multiple directories in a single volume, each directory containing various filenames each of which may be mapped to a multitude of storage devices 130.

Client system 160 may run one or more applications (e.g., word processing or database programs, typified by application 161) that utilize the storage system. Client system 160 includes a computer system that interacts with server system 110 for submitting read/write access requests and for receiving or transmitting data from or to the server system 110 over the network 165. In a virtual server environment, application 161 on client system 160 may interact over the network 165 with one or more virtual machines (VMs) 115 executing on server system 110.

As mentioned above, various embodiments include a system monitoring tool that receives data from the system assets, monitors performance of the system assets, and provides user access to analyzed system data. System 190 includes a system monitoring tool that is implemented as an application. For instance, a system monitoring tool can be implemented as application 161 at client 160. Additionally or alternatively, the system monitoring tool may be implemented as one of applications 112, 117.

For the purposes of this example, application 117 is described as the system monitoring tool. The system monitoring tool 117 receives system data by communicating with storage operating systems at each storage controller 101. For instance, system monitoring tool 117 may communicate via API to receive system information, such as hardware names, volume names, usage data, read and write operations per second, and the like. Various types of system information are described in more detail below. In short, the system information of this example includes any type of information that allows the monitoring tool 117 to construct a comprehensive description of the architecture and performance of system 190.

Server system 110 includes a computer system that executes applications and interacts with the client system 160 for receiving read/write access requests and receiving or transmitting data from or to the client system 160 over the network 165. Server system 110 in this example is connected to the client system 160 over a network 165 such as a local area network (LAN), an Ethernet subnet, a PCI or PCIe subnet, a switched PCIe subnet, a wide area network (WAN), a metropolitan area network (MAN), the Internet, or the like.

The server 110 may include any appropriate computer hardware and software. In one example, server 110 includes a general-purpose computer configured to execute any of a variety of operating systems, including the Unix™, Linux™, and Microsoft Windows™ operating systems.

Server system 110 includes hypervisor 113, which creates and manages one or more Virtual Machines (VMs)—in this case, VM 115. The present example shows only a single VM 115, though in other embodiments, the server 110 includes multiple VMs (not shown), each VM being used by and connected with a client 160 through computer network 165. Thus, systems with more than one client 160 may include more than one VM 115, each client being supported by at least one VM. VM 115 includes an encapsulation or instance of an operating system and applications 112 and 117 executing on top of that instance. Briefly, application 112 provides read/write access to the clients 160 to data stored in cluster 135. Application 117 is a system monitoring tool described in more detail below. In some embodiments, different types of VM hypervisors 113 may be used (e.g., VMware™ ESX, Microsoft™ Hyper-V, etc.).

Each storage system 100 is configured to allow server 110 to access its data, for example, to read or write data to the storage system. The server 110 executes application 112 that "connects" to storage systems 100 over computer network 167 to send an access request (read or write request) to storage system 100 for accessing particular data stored on the storage system 100. The VM application 112 executing on the server 110 services the connected client 160 by receiving the client access requests and submitting the access requests to the storage system 100 for execution.

The scope of embodiments is not limited to the particular architecture of system 190. For instance, other systems may include additional servers, each server being similar to server 110. While the example of FIG. 1 shows only one client 160, it is understood that any appropriate number of clients may be supported by the system 190. Moreover, while cluster 135 shows two storage subsystems 100a and 100b, it is understood that any appropriate number of controllers and storage drive arrays may be used with various embodiments. For instance, some embodiments may include only a single storage subsystem, whereas other embodiments may include three or more storage subsystems. In other words, the scope of embodiments is not limited to a single storage cluster.

System monitoring tool 117 monitors the assets of system 190, where the assets include any hardware or software component that is included in the architecture of system 190 or affects the performance of the system 190. Examples of assets include the underlying storage drives (e.g., HDDs and SSDs), virtual volumes, storage controllers, storage subsystems, aggregates of storage subsystems, network connections, virtual machines, hypervisors, applications, and the like.

Figure 2:
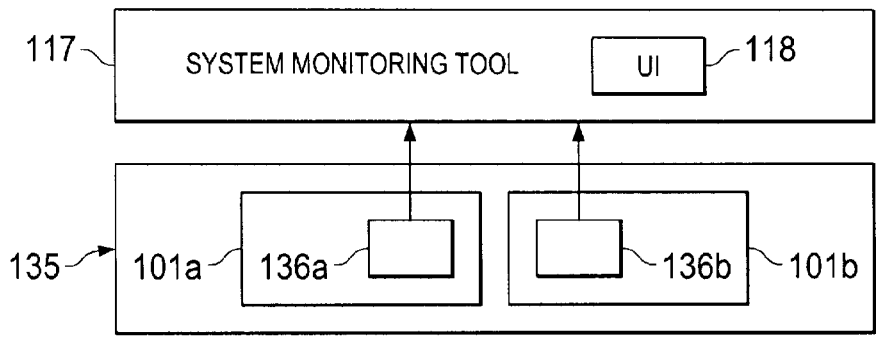
FIG. 2 is a block diagram illustration of an example conceptual layout according to one embodiment.

FIG. 2 is a block diagram illustration of an exemplary conceptual layout according to one embodiment. Application 117 is a system monitoring application that provides for data collection, analysis, and display for performance aspects of system 190. As explained above with respect to FIG. 1, tool 117 may be run in a VM in a storage server; additionally or alternatively, a performance management tool may be embodied as an application run on a client (not shown) or on any appropriate computer in communication with cluster 135.

A human user interacts with system monitoring tool 117 via UI 118. UI 118 may include a command line interface, a graphical User interface (GUI), or other appropriate interface. The human user may rely on UI 118 for troubleshooting and viewing performance data. For instance, the human user may input information identifying requested performance statistics, identify new assets, and change settings using UI 118. FIG. 3 below describes an example screen that may be displayed by IU 118.

Storage Operating Systems (OSs) 136 run on storage controllers 100 (FIG. 1). The scope of embodiments may include any appropriate OS that provides low-level control to implement virtual storage on storage drives. Storage OS instances 136 run on one or more processors at storage controllers 100. Also, communication between storage OSs 136 and system monitoring tool 117 go through communication links, such as network 167 (FIG. 1).

System monitoring tool 117 automatically imports information on the various infrastructure assets in system 190, providing accurate and real-time visibility of servers, virtual servers, Host Bus Adaptors (HBAs), switches, storage arrays, and the like. In one example, system monitoring tool 117 discovers the assets by polling each of the assets that it is aware of. Each of the deployed assets provides one or more Application Programming Interfaces (APIs) that can be invoked to request information therefrom. System monitoring tool 117 is programmed to use those APIs to automatically import the information. Imported information can include, but is not limited to, device type, latency, operations per second, faults, and the like. The scope of embodiments is not limited to any particular asset information, and any appropriate asset information may be imported in various embodiments.

Monitoring tool 117 is operable to gather asset health information from any system asset, no matter the vendor, as long as monitoring tool 117 is programmed to use appropriate protocols defined by the relevant APIs. While many vendors use different API's, monitoring tool 117 may save and access communication protocol instructions for some or all of the different storage assets.

In one example, a storage controller has a counter that increments at each Input/Output (I/O) operation. One or more relevant APIs define communication protocols for monitoring tool 117 to request and receive the counter information for the storage controller. Monitoring tool 117 accesses communication protocol instructions (e.g., at RAM at server 110) for the storage asset and desired information and uses such instructions to formulate its request for the counter information. Monitoring tool 117 is programmed to access the communication protocol instructions as needed, and the communication protocol instructions can be pre-programmed and/or continually updated to include relevant APIs for each of the different system assets. Monitoring tool 117 is, therefore, able to request information from system assets, regardless of vendor, as long as monitoring tool 117 can access communication protocol instructions for those system assets for the desired information.

Of course, a computer system may include a variety of different types of system assets. Monitoring tool 117 polls the various system assets periodically and receives raw data therefrom. Monitoring tool 117 then creates one or more data logs with the data received from the system assets. The data log may be stored, e.g., at the server 110 in RAM, in any appropriate format, such as key value pairs in a database or as one or more files. Monitoring tool 117 creates a comprehensive data log by periodically polling each available asset and collecting data therefrom.

The scope of embodiments may include any appropriate raw or processed information in a data log. One example data log entry includes an identifier of an asset, a timestamp, performance and configuration data, and an indication of whether an error exists. Examples of derived performance information that may be included in a data log include latency, I/O Operations per Second (IOPS), throughput (e.g., in Gb/sec), CPU usage, memory usage, and IP throughput (network throughput, e.g., in Gb/sec).

FIG. 3 is an example display 300 of system asset health information according to one embodiment. FIG. 3 may be presented by UI 118 (FIG. 1) on a display screen of a computing device to a human user. The underlying data analysis is performed by system monitoring tool 117 (FIG. 1). FIG. 3 shows a graphical display in which health information for a system asset is presented in timeline form, thereby providing the human user with intuitive, digestible information.

Display 300 includes asset indication 302. In the example of FIG. 3, a given system asset is also referred to as a "data source." In this example, the data source is a switching component referred to as "B1." A Summary section includes fields 304-314. Field 304 indicates that an acquisition unit is local. Type field 306 provides a vendor and model name for asset B1. Field 308 indicates that the system has collected configuration and performance data for asset B1. Examples of configuration data include names of allocated assets (e.g., volumes and VMs and hypervisors), capacity of volumes, speed of network ports, amount of memory allocated for an asset, CPU count, etc. Field 310 provides a comment section, which in this example indicates that a technician is working on asset B1. Comments may be entered, e.g., in another interface display for providing work notes.

Field 312 includes an indication of the most recent configuration status of the asset. In this example, the most recent status includes no errors, so a "success" indication is provided. Similarly, performance status is currently error-free, so an "OK" status is given at field 314. Field 315 indicates a currently-installed software package for asset B1. In various embodiments, software package information may or may not be gathered from data logs. In one example, monitoring tool 117 may include a software patch management tool that provides information for field 315.

Below the Summary portion is the Event Timeline portion. Display 300 in this example includes two timelines:

320 and 330. However, other embodiments may include any appropriate number and types of timelines. The example of FIG. 3 shows timeline 320 to summarize configuration data and timeline 330 to summarize performance data.

Timeline 320 shows time periods 321-327. Each time period 321-327 on timeline 320 corresponds to a range of consecutive data log timestamps having a same state. For instance, time period 321 indicates a range of consecutive time stamps in the data log in which B1's configuration data showed no errors. Similarly, time period 324 indicates a range of consecutive time stamps in the data log in which B1's configuration data showed one or more errors. Time period 322, however, is different from time periods 321 and 324 because it indicates a period of data collection being suspended. Thus, it represents a time without collected configuration data in the data log.

In the example of FIG. 3, each of the time periods is given a visual cue—in this case, differing fill patterns. One fill pattern is used for periods of no error status; a second fill pattern is used for periods of error present status; a third fill pattern is used for periods of data collection being suspended. The scope of embodiments includes any appropriate visual cue. For instance, another example visual cue includes color contrast, where blue is used for periods of no error status, red is used for periods of error present status, and white is used for periods of data collection being suspended.

Timeline 330 is similar to timeline 320 in that it also plots health status information visually against time. Timeline 330 shows performance health status in time periods 331-337. For instance, time periods 332 and 336 indicate errors, whereas the other time periods of timeline 330 show either no errors or collection suspended. Examples of performance errors include loss of functionality, unacceptable performance in a metric such as IOPS or CPU usage or latency, or other less than optimal behavior in asset B1. FIG. 3 indicates that timelines 320 and 330 show status information for a cumulative period of 15 days; however, other embodiments may plot status against time for any appropriate amount of time.

Display 300 is interactive. Any tool now known or later developed to provide an interactive Graphical User Interface (GUI) may be used in various embodiments. For instance, HTML or JAVA or other appropriate web technologies may be used to form each of the time periods 321-327 and 331-337 as an active screen control similar to a button or other selectable element. A user then employs a selection method, such as moving a cursor or touching a touch screen, to select one or more time periods from timelines 320 and 330.

In the present example, FIG. 3 shows time period 326 having been selected. Another visual cue is used to indicate the selection of time period 326, in this case, highlighting. Monitoring tool 117 includes functionality to recognize that a time period has been selected and to display at least a portion of the data log that corresponds to the selected time period. Thus, in response to the selection of time period 326, monitoring tool 117 renders log portion 340, which shows data from the data log for asset B1 during time period 326. Field 350 shows a specific date and time range corresponding to the time stamps within the data log during time period 326. Log portion 340 shows configuration log data for asset B1. In this example, one of the switch elements of asset B1 shows an error "Failed to parse connectivity table." In some embodiments, only the error data is shown, whereas data log entries success are omitted.

The embodiment of FIG. 3 provides one or more advantages over prior solutions. For instance, in the present embodiment a human user may briefly scan timelines 320 and 330 for an easily digestible summary of health status information. The human user may then acquire more in-depth information for the health status in a particular time period by selecting a time period. The monitoring tool 117 then displays a corresponding portion of the data log, which the user can read for more specific information regarding the particular error. Such embodiment stands in contrast to prior solutions that provided data log information only.

Figure 4:
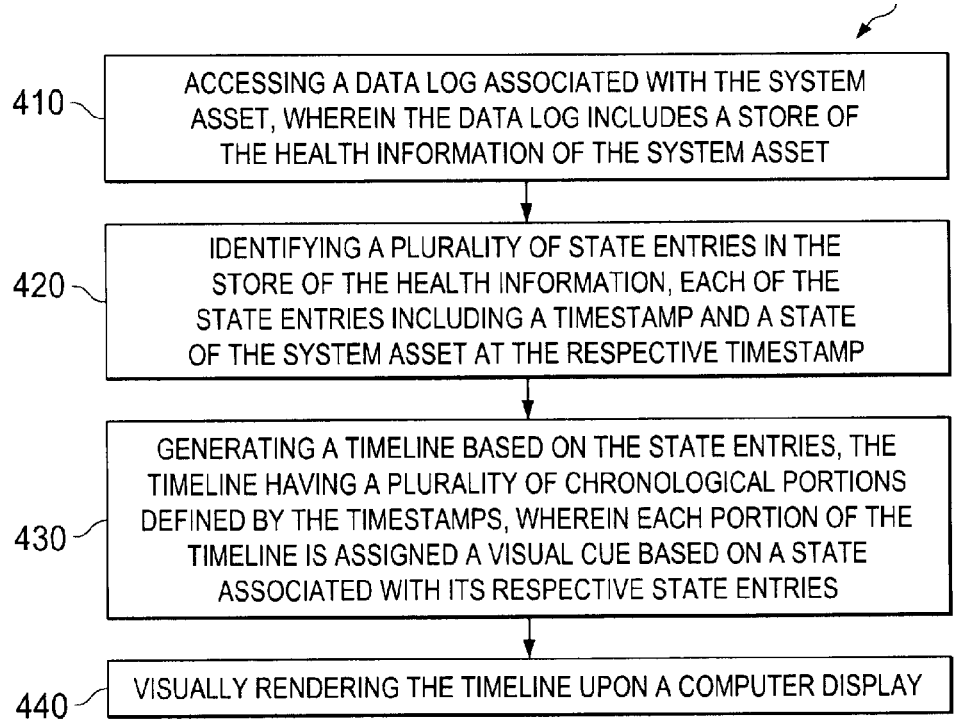
FIG. 4 is an illustration of example process, adapted according to one embodiment.

FIG. 4 is an illustration of example process 400, adapted according to one embodiment. Process 400 may be performed, e.g., by a computer that is running system monitoring application 117 and displaying UI 118 on a display screen. For instance, one or more processors at the computer may read computer-executable code from a computer-readable medium (e.g., RAM) and perform the functions described below by virtue of executing the code.

At action 410, the application accesses a data log associated with the system asset, wherein the data log includes a store of the health information of the system asset. As noted above, The data log may be stored, e.g., at the server 110 in RAM or other memory or at another device. The data log may also be implemented using any appropriate format, such as key value pairs in a database or as one or more files. The system creates a comprehensive data log by periodically polling each available asset and collecting data therefrom. Each entry in the data log, in this example, includes at least a timestamp and an indication of a health status of the system asset so that over time the data log represents health status information over a significant period of time, such as weeks or years.

The accessing at action 410 may be performed in any appropriate manner. For instance, if the data log is stored at the same device that runs the application, then the application may use its operating system to access the relevant data. If the data log is stored remotely, the application may make one or more requests over a network. Action 410 may be performed, in some embodiments, in response to detecting that a user has accessed a timeline interface corresponding to the particular system asset of interest.

At action 420, the application identifies a plurality of state entries in the store of the health information. In one example, the application parses text of the various entries in the data log to identify entries that are relevant. Thus, if the application is building a timeline for a particular asset to show the health of the asset over three weeks, the application may parse the text of the entries to identify entries corresponding to the particular system asset within the specified time period.

System asset status may include as many different health states as is desirable for a particular system. In one example, there are three health states: no error, error present, and data collection suspended, with each health state corresponding to a status. However, other systems may include simple error or no error health states, whereas other systems may include more health states to indicate a larger variety of possible errors.

Action 420 may also include extracting the identified data log entries. Thus, the application may copy information from the identified data log entries to a processor cache to be processed.

At action 430, the application generates a timeline based on the state entries. For instance, the application may generate the timeline as a group of discrete points, each point corresponding to a timestamp entry. In such an embodiment, the application logically assigns each entry to a point in a chronological order based on timestamps.

Additionally or alternatively, the application may generate the timeline portion-by-portion, where each portion represents multiple timestamp entries with the same system asset status. Thus, the application may gather consecutively stamped entries and create a timeline portion with a length proportionally related to the timespan represented by the span of timestamps. The application may create as many portions as there are health status events during the overall time period.

Further in this example, the timeline has a plurality of chronological portions defined by the timestamps. Each portion of the timeline is assigned a visual cue based on a state associated with its respective state entries. In one example, the visual cue may include a color assignment and/or a fill pattern (e.g., a cross hatch). However, the scope of embodiments may include any appropriate distinguishing cue. In the example of FIG. 3, fill patterns are used to indicate health status, with one fill pattern indicting error present, another fill pattern indicating no error, and another fill pattern indicating data collection is suspended.

In some examples, the application generates the timeline as an interactive interface. The application may generate an interactive interface by creating one or more of the visual elements of the interface as a conventional web-based active screen control. Thus, the application may organize the timeline elements as well as other elements into HTML or JAVA code. Examples of active screen controls include buttons and other selectable elements. The embodiment of FIG. 3 includes creating the portions 321-327 and 331-337 as selectable elements in a GUI.

At action 440, the application visually renders the timeline upon a computer display, as in display 300 of FIG. 3. Action 440 may include, e.g., sending the HTML or other code defining the interface to a browser. As shown in the example of FIG. 3, each timeline 320 and 330 includes a visual element with a length thereof representing a cumulative span of time of three weeks. Each of the portions 321-327 and 331-337 also has a length proportional to the time it represents, with each of the portions placed chronologically within its respective timeline.

The scope of embodiments is not limited to the specific actions shown in FIG. 4. Rather, other embodiments may add, omit, rearrange, or modify actions. In one example, the application detects that a user has selected a portion of the timeline by, for instance, detecting that a user has selected the portion with a cursor or by touching a touch screen. The code defining the display then activates a routine that accesses and displays portions of the data log that correspond to the selected portion. An example is shown in log portion 340 of FIG. 3. A human user may select a portion of the timeline in order to view the corresponding log entries.

Further, some embodiments include the application collecting the data to generate the data log. As noted above, in some examples the application is operable to gather asset health information from any system asset, no matter the vendor, because the application is pre-programmed to use appropriate protocols defined by the relevant APIs. Thus, the application saves and accesses communication protocol instructions for some or all of the different storage assets. The application polls the various assets using the pre-programmed protocols to gather the data and generates the data log from the gathered data.

Figure 5:
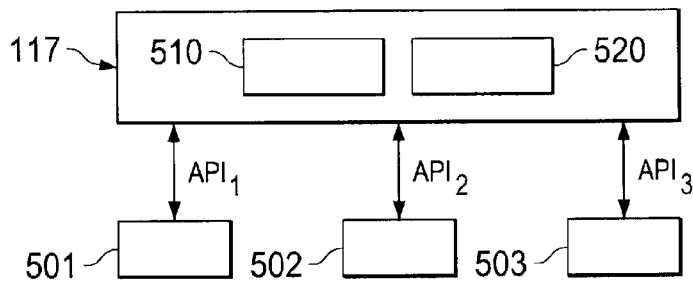
FIG. 5 is an illustration of an example use case according to one embodiment and illustrates an example system in which the novel techniques may be implement.

For instance, attention is drawn to FIG. 5, which shows an example scenario according to one embodiment. Application 117 includes instructions 510 (stored to RAM or other memory at server 110, not shown) allowing application 117 to use appropriate protocols to communicate with assets 501-503. Application 117 also includes data log 520 (stored to RAM or other memory at server 110, not shown). Each of the storage assets 501-503 are provided by different vendors. For instance, each asset 501-503 may include a storage system from a different company with different underlying communication protocols. Application 117 is operable to request and receive system asset health information from each asset 501-503.

Assets 501-503 each have communication protocols that are defined by APIs—in this case, API1, API2, and API3 respectively. As noted above; each vendor may have very different protocols. In this example, instructions 510 are pre-programmed with the protocols defined by the different APIs. Monitoring tool 117 is programmed to access the communication protocol instructions 510 as needed, and the communication protocol instructions 510 are pre-programmed and/or continually updated to include relevant APIs for each of the different system assets. Monitoring tool 117 is, therefore, able to request information from system assets 501-503, regardless of vendor, as long as monitoring tool 117 can access communication protocol instructions for those system assets for the desired information. Thus, in one example, monitoring tool 117 accesses asset 501 by first examining instructions 510 for the protocol defined by API1, and after retrieving the relevant portions of instructions 510, application 117 formulates a request for information according to API1. Of course, application 117 would do the same for assets 502 and 503, respectively, when requesting information therefrom. FIG. 5 illustrates a use case in which heterogeneous storage systems 501-503 from different vendors are plugged into monitoring tool 117 so that monitoring tool 117 can gather information from disparate sources 501-503 in a combined GUI (e.g., 118 of FIG. 2).

It should be noted that the examples above are given in the context of a network storage system, through the scope of embodiments is not so limited. Rather, the concepts described above may be implemented in any type of computing cluster, wherein performance data is sampled and analyzed. One example embodiment includes a cluster of server nodes, where performance data for the server nodes themselves, as well as for the applications running on the server nodes, is sampled according to a workload of each node or application. Process 400 would generate and display a timeline relevant to the health of an asset of the server cluster.

When implemented via computer-executable instructions, various elements of embodiments of the present disclosure are in essence the software code defining the operations of such various elements. The executable instructions or software code may be obtained from a non-transient, tangible readable medium (e.g., a hard drive media, optical media, RAM, EPROM, EEPROM, tape media, cartridge media, flash memory, ROM, memory stick, network storage device, and/or the like). In fact, readable media can include any medium that can store information.

In the embodiments described above, example clients 160, server 110, and storage controllers 101 include processor-based devices and may include general-purpose processors or specially-adapted processors (e.g., an Application Specific Integrated Circuit). Such processor-based devices may include or otherwise access the non-transient, tangible, machine readable media to read and execute the code. By executing the code, the one or more processors perform the actions of the process of FIG. 4.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method of displaying health information of a system asset from among a plurality of system assets of a networked storage system used for storing and retrieving data on behalf of clients, the method comprising:
   accessing stored communication protocol information for communicating with the plurality of system assets of the networked storage system, where at least two different communication protocols are used to communicate with at least two different system assets of the networked storage system;
   collecting performance related data of the plurality of systems assets, where the performance related data includes latency in processing read and write requests, number of input/output operations (IOPS) for writing and reading stored data, amount of data transferred and memory usage;
   collecting configuration related data of the plurality of systems assets, where the configuration related data includes capacity of storage volumes of the networked storage systems, speed of network ports used within the networked storage system, an amount of memory allocated for systems asset and a CPU count;
   storing the performance related data and the configuration related data associated with the system asset in a data log;
   accessing the data log associated with the system asset, wherein the data log includes a store of the health information of the system asset for tracking configuration status based on collected configuration related data and performance status based on collected performance related data of the system asset;
   identifying a plurality of state entries in the store of the health information, each of the state entries including a timestamp and a state of the system asset at the respective time stamp;
   generating a summary segment indicating that configuration related data and performance related data for the system asset has been collected and an indicator of a recent status of configuration and performance of the system asset;
   generating a first timeline based on the state entries for providing a visual representation of performance of the system asset;
   generating a second timeline based on the state entries for providing a visual representation of configuration status for the system asset over time indicating when applicable, that the system asset had no configuration errors, had configuration errors and configuration related data collection was suspended; wherein the first and the second timeline having a plurality of chronological portions defined by the timestamps, and wherein each portion of the first and the second timeline is assigned a visual cue based on a state associated with its respective state entries; and
   visually rendering the first timeline and the second time line upon a computer display.

2. The method of claim 1, wherein the visual cue is selected from a group consisting of a color and a fill pattern.

3. The method of claim 1, wherein the state is selected from a group consisting of no error, collection suspended, and error present.

4. The method of claim 1, further comprising:
   assigning an active screen control to a first portion of the first and second timeline corresponding to a range of state entries with consecutive timestamps having a same state.

5. The method of claim 4, further comprising:
   detecting activation of the active screen control; and
   displaying additional information about the state entries.

6. The method of claim 5 wherein the additional information includes a least a portion of the data log having information associated with the state entries corresponding to the consecutive timestamps.

7. The method of claim 5, further comprising changing the visual cue of the first region based on the detected activation.

8. The method of claim 1 wherein identifying the plurality of state entries comprises:
   text parsing the data log.

9. The method of claim 1, wherein the system asset includes at least one of:
   a storage drive;
   a storage controller;
   a virtual volume; and
   a network interface controller.

10. A computer program product having a non-transitory, computer readable medium tangibly recording computer program logic for providing monitoring of a plurality of system assets of a networked storage system used for storing and retrieving data on behalf of clients, the computer program product comprising:
    code to access stored communication protocol information for communicating with the plurality of system assets of the networked storage system, where at least two different communication protocols are used to communicate with at least two different system assets of the networked storage system;
    code to collect performance related data of the plurality of systems assets, where the performance related data includes latency in processing read and write requests, number of input/output operations (IOPS) for writing and reading stored data, amount of data transferred and memory usage;
    code to collect configuration related data of the plurality of systems assets, where the configuration related data includes capacity of storage volumes of the networked storage systems, speed of network ports used within the networked storage system, an amount of memory allocated for systems asset and a CPU count;
    code to store the performance related data and the configuration related data associated with the system asset in a data log;
    code to access a plurality of entries in the data log, each of the entries including a timestamp and a status of a system asset at the respective time stamp indicating a configuration status based on collected configuration related data and a performance status based on collected performance related data of the system asset;
    code to generate a summary segment indicating that configuration related data and performance related data for the system asset has been collected and an indicator of a recent status of configuration and performance of the system asset;

code to generate a first timeline for providing a visual representation of performance of the system asset, based on the accessed entries of the data log, code to generate a second timeline based on the accessed entries for providing a visual representation of configuration status for the system asset over time indicating when applicable that the system asset had no configuration errors, had configuration errors and configuration data collection was suspended; wherein the first timeline and the second timeline having a plurality of chronological portions, wherein each portion of the first and the second timeline represent a performance status and a configuration status of the system asset during a respective time period, further wherein each portion of the first and the second timeline is assigned a distinguishing cue based on a status of the system asset associated with its respective data log entries; and code to render visually the first and the second timeline upon a computer display.

11. The computer product of claim 10, wherein the data log includes a store of health information of the system asset.

12. The computer program product of claim 10, wherein the code to access entries comprises:

code to text parse the entries of the data log to extract timestamps and system asset health information.

13. The computer program product of claim 10, further comprising:

code to assign an active screen control to a first portion of the first and the second timeline corresponding to a range of data log entries with consecutive timestamps having a same status.

14. The computer program product of claim 13, further comprising:

code to detect activation of the active screen control; and code to display a least a portion of the data log having information associated with entries corresponding to the consecutive timestamps.

15. The computer program product of claim 13, further comprising changing the visual cue of the first region based on the detected activation.

16. The computer program product of claim 10, wherein a status of the system asset is selected from a group consisting of no error, collection suspended, and error present.

17. The computer program product of claim 10, wherein the distinguishing cue is selected from a group consisting of a color and a fill pattern.

18. A system, comprising:

a memory containing machine readable medium comprising machine executable code having stored thereon instructions; and a processor module coupled to the memory, the processor module executes the machine executable code to:

access stored communication protocol information for communicating with the plurality of system assets of the networked storage system used for storing and retrieving data on behalf of clients, where at least two different communication protocols are used to communicate with at least two different system assets of the networked storage system;

collect performance related data of the plurality of systems assets, where the performance related data includes latency in processing read and write requests, number of input/output operations (IOPS) for writing and reading stored data, amount of data transferred and memory usage;

collect configuration related data of the plurality of systems assets, where the configuration related data includes capacity of storage volumes of the networked storage systems, speed of network ports used within the networked storage system, an amount of memory allocated for systems asset and a CPU count;

store the performance related data and the configuration related data associated with the system asset in a data log;

access the data log associated with the system asset, wherein the data log includes a store of the health information of the system asset for tracking configuration status based on collected configuration related data and performance status based on collected performance related data of the system asset;

identify a plurality of state entries in the store of the health information, each of the state entries including a timestamp and a state of the system asset at the respective time stamp;

generate a summary segment indicating that configuration related data and performance related data for the system asset has been collected and an indicator of a recent status of configuration and performance of the system asset;

generate a first timeline based on the state entries for providing a visual representation of performance of the system asset;

generate a second timeline based on the state entries for providing a visual representation of configuration status for the system asset over time indicating when applicable, that the system asset had no configuration errors, had configuration errors and configuration related data collection was suspended; wherein the first and the second timeline having a plurality of chronological portions defined by the timestamps, and wherein each portion of the first and the second timeline is assigned a visual cue based on a state associated with its respective state entries; and visually rendering the first timeline and the second time line upon a computer display.

19. The system of claim 18, wherein the visual cue is selected from a group consisting of a color and a fill pattern.

20. The system of claim 18, wherein the state is selected from a group consisting of no error, collection suspended, and error present.

21. The system of claim 18, further comprising:

assigning an active screen control to a first portion of the first and second timeline corresponding to a range of state entries with consecutive timestamps having a same state.

22. The system of claim 18, wherein the system asset includes at least one of:

a storage drive;

a storage controller;

a virtual volume; and a network interface controller.

23. The system of claim 18, wherein at least two system assets of the plurality of systems assets include two storage systems from different vendors accessible using different communication protocols.

* * * * *